United States Patent
Klingerman et al.

(10) Patent No.: US 9,925,556 B2
(45) Date of Patent: Mar. 27, 2018

(54) METHOD FOR APPLYING WAX TO A VEHICLE

(71) Applicants: Duane A. Klingerman, North Hollywood, CA (US); Patricia B. Klingerman, North Hollywood, CA (US); Wyatt B. Klingerman, North Hollywood, CA (US); Kerri A. Klingerman, North Hollywood, CA (US)

(72) Inventors: Duane A. Klingerman, North Hollywood, CA (US); Patricia B. Klingerman, North Hollywood, CA (US); Wyatt B. Klingerman, North Hollywood, CA (US); Kerri A. Klingerman, North Hollywood, CA (US)

( * ) Notice: Subject to any disclaimer, the term of this patent is extended or adjusted under 35 U.S.C. 154(b) by 0 days.

(21) Appl. No.: 15/000,954

(22) Filed: Jan. 19, 2016

(65) Prior Publication Data
US 2017/0246655 A1    Aug. 31, 2017

(51) Int. Cl.
*B05D 1/04* (2006.01)
*C09G 1/08* (2006.01)

(52) U.S. Cl.
CPC .................. *B05D 1/04* (2013.01); *C09G 1/08* (2013.01)

(58) Field of Classification Search
None
See application file for complete search history.

(56) References Cited

U.S. PATENT DOCUMENTS

| 2005/0155515 A1* | 7/2005 | Jordan | C08L 91/06 106/10 |
| 2005/0284960 A1* | 12/2005 | Arevalo | B05B 1/1636 239/310 |

\* cited by examiner

*Primary Examiner* — Nathan T Leong
(74) *Attorney, Agent, or Firm* — John R. Ross; John R. Ross, III

(57) ABSTRACT

A method for applying a wax formulation to a vehicle. A water hose is connected at one end to a water source and at the other end it is connected to a siphon-sprayer having a wax formulation in its container. The wax formulation includes water and wax emulsions. The water is turned on and flows from the water source through the water hose and then through the siphon-sprayer. The wax formulation is siphoned up from the siphon-sprayer to form a wax formulation and water mixture that is then sprayed onto the vehicle. After application of the wax formulation and water mixture, no further step of buffing or wiping is required. In a preferred embodiment, the wax emulsion is a cationically charged wax emulsion.

1 Claim, 1 Drawing Sheet

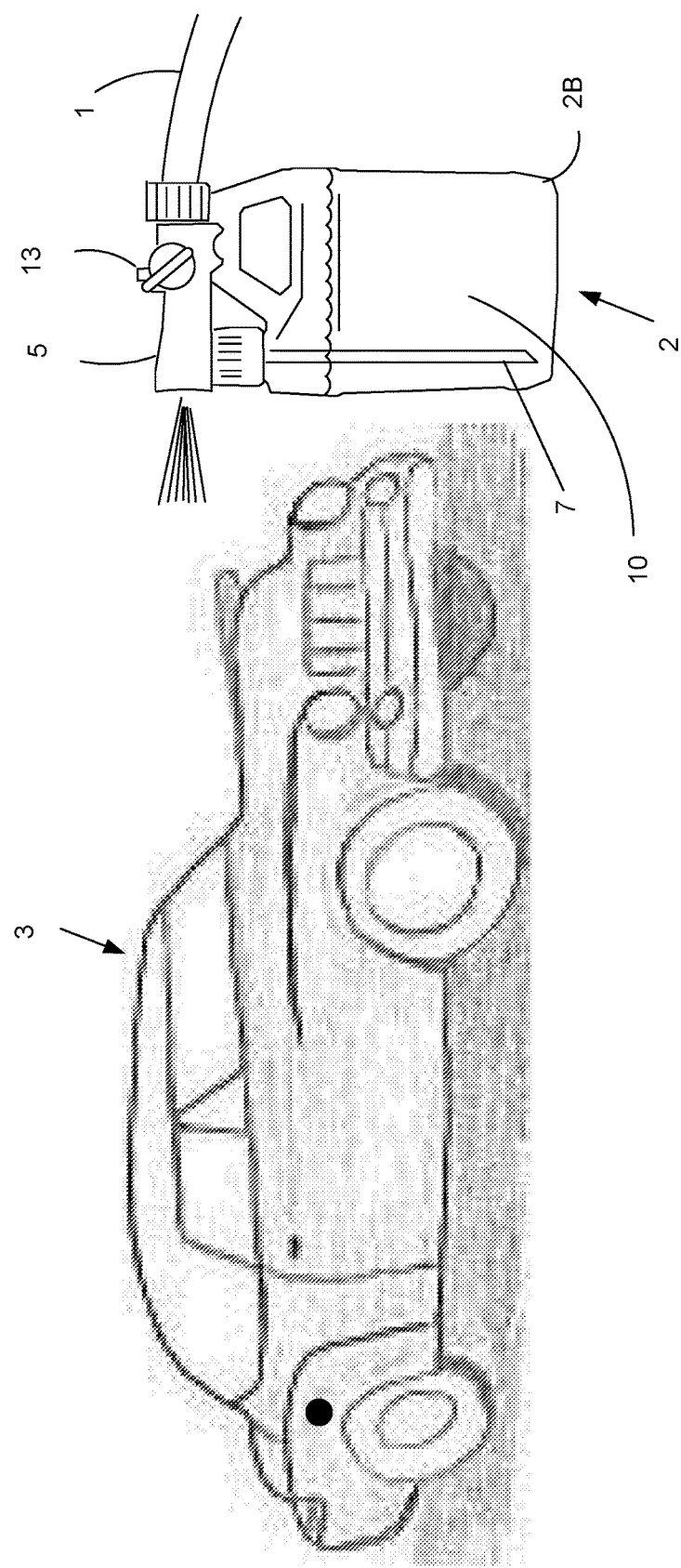

METHOD FOR APPLYING WAX TO A VEHICLE

The present invention relates to vehicle appearance enhancing materials, and in particular, to vehicle wax.

BACKGROUND OF THE INVENTION

Traditional protective and finish enhancing products, including waxes, sealers, and glazers require time and energy to be manually applied to the surfaces to be coated in order to achieve the desired results. This commonly involves the uniform spreading of the product over the surface by hand with an applicator or towel, or with the assistance of a machine, such as a low or high-speed buffer. Next, the carrier medium (water, petroleum distillates, or blend of the two) is given time to evaporate and deposit the protective and gloss enhancing agents on the surface. Finally, the product is buffed or wiped to remove the residue of excess product, polishing agents and abrasives, and to even out any unevenness of the coating.

These products come in a variety of forms, including paste waxes (hard cake and pre-softened), an array of liquid products including waxes, sealers and glazes, and some spray-and-wipe products. All these products, no matter how advanced require the user to buff or wipe the product after it has been applied.

Carnauba Wax

Carnauba wax, also called Brazil wax and palm wax, is a wax of the leaves of the palm *Copernicia prunifera*, a plant native to and grown only in the northeastern Brazilian states of Piauí, Ceará, and Rio Grande do Norte. It is known as the "queen of waxes" and usually comes in the form of hard yellow-brown flakes. It is obtained from the leaves of the carnauba palm by collecting them, beating them to loosen the wax, then refining and bleaching the wax.

Cationically Charged Waxes

Cationically charged waxes are known, for example, Tomah Products C-340 is a cationic emulsion of pure carnauba wax. The cationic emulsifiers are positively charged and function to ensure rapid and uniform deposition of a thin film of carnauba wax on most substrates, including fabric, metal wood, leather, and painted surfaces.

Michelman, Inc.'s ME09625 Cationic Emulsion is a cationically charged wax emulsion. A primary purpose is its utilization in floor polish.

Anionic and Nonionic Wax Emulsions

Anionic wax emulsions are negatively charged and nonionic wax emulsions are not charged.

What is needed is a better method for applying wax to a vehicle.

SUMMARY OF THE INVENTION

The present invention provides a method for applying a wax formulation to a vehicle. A water hose is connected at one end to a water source and at the other end it is connected to a siphon-sprayer having a wax formulation in its container. The wax formulation includes water and wax emulsions. The water is turned on and flows from the water source through the water hose and then through the siphon-sprayer. The wax formulation is siphoned up from the siphon-sprayer to form a wax formulation and water mixture that is then sprayed onto the vehicle. After application of the wax formulation and water mixture, no further step of buffing or wiping is required. In a preferred embodiment, the wax emulsion is a cationically charged wax emulsion.

BRIEF DESCRIPTION OF THE DRAWINGS

FIG. 1 shows a preferred embodiment of the present invention.

DETAILED DESCRIPTION OF THE PREFERRED EMBODIMENTS

The present invention provides an improved wax for surfaces such as the surface of a vehicle. In a preferred embodiment a user at his home applies the wax to his vehicle, such as an automobile. By utilizing the improved wax it becomes faster and easier to apply the wax to the vehicle. In one preferred embodiment, wax formulation 10 is applied to vehicle 3 utilizing garden water hose 1 equipped with siphon-sprayer garden hose attachment 2 (as shown in FIG. 1). Siphon-sprayer garden hose attachment 2 siphons up wax formulation 10 through siphon tube 7 in container 2B and mixes it with water from water hose 1 as the water passes through spray nozzle 5. Preferably, siphon-sprayer garden hose attachment 2 is set to siphon at a fixed rate.

Utilizing the above described method, the improved wax is simply sprayed over an entire surface being treated. After the wax has been applied, the user is finished. He does not need to: 1) wait for the product to evaporate, 2) buff or wipe the surface to remove residue, excess product, polishing agents or abrasive material, 3) rub the surface to even out the coating.

Preferred Formulation for the Wax

The following is a listing of a preferred formulation for the wax:
1) six parts Tomah Products C-340 (trade name) Carnauba wax emulsion (a cationically charged wax)
2) twelve parts Michelman, Inc.'s ME09625 (trade name) wax emulsion (a cationically charged wax)
3) fourteen parts water. The water decreases the viscosity of the formulation to make the formulation easier to siphon.

Applicant tested the above formulation with outstanding results. The above listed formulation was dispensed through a Venturi-action, siphon-spayer attached to a garden hose. The formulation was diluted through the fixed rate sprayer so as the solution being sprayed onto the vehicle was 0.3%-0.8% formulation and 99.2%-99.7% water.

The above listed formulation is a preferred formulation. Other formulations are possible. The positively charged cationic ingredients allow the wax formulation to automatically attract itself to the negatively charged surface of the automobile. The charged wax molecules abandon the water and attach to the vehicle surface. They then remain in place during any rinsing and drying of the vehicle. Then, the wax hardens. This makes the coating more resistant to natural elements, weather, and subsequent washings.

It should be noted that in other formulations it is possible to include anionic or nonionic wax emulsions in the formulation. In one preferred embodiment, the anionic or nonionic wax emulsion is combined with the cationically charged emulsion to create the formulation. In another preferred, embodiment the formulation includes a mixture of anionically charged emulsions and nonionically charged emulsions. In another preferred embodiment, the formulation includes only nonionically charged emulsions. In another preferred embodiment, the formulation includes only anionically charged emulsions.

It should be noted that while a variety of wax formulations are possible, the preferred formulation utilizes cationically charged wax emulsions because the positively charged wax molecules abandon the water and attach to the negatively charged vehicle surface.

Although the above-preferred embodiments have been described with specificity, persons skilled in this art will recognize that many changes to the specific embodiments disclosed above could be made without departing from the spirit of the invention. For example, although the above description listed as an example a formulation that included:

1) six parts Tomah Products C-340 (trade name) Carnauba wax emulsion (a cationically charged wax),
2) twelve parts Michelman, Inc.'s ME09625 (trade name) wax emulsion (a cationically charged wax), and
3) fourteen parts water, it should be noted that the specific ratio of the mixture of waxes can be modified. In other words, this was just one preferred embodiment of a formulation. Many other formulations are also possible. Therefore, the attached claims and their legal equivalents should determine the scope of the invention.

What is claimed is:

1. A method for applying a wax formulation to a vehicle, said method comprising the steps of:
   A. connecting a water hose to a siphon-sprayer with wax formulation container,
   B. pouring wax formulation into said container, said wax formulation comprising:
      i. at least one wax emulsion, comprising
         a. six parts of a first cationically charged emulsion,
         b. twelve parts of a second cationically charged emulsion, and
      ii. fourteen parts water to decrease viscosity,
   C. allowing water to flow from a water source through said water hose and through said siphon-sprayer,
   D. siphoning said wax formulation up from said siphon-sprayer to mix with the flowing water, and
   E. spraying said wax formulation and water mixture onto said vehicle,
   wherein said wax emulsion is diluted with water to create said wax formulation prior to being siphoned through said siphon sprayer as a result of water flow from said water source, wherein a solution leaving said siphon sprayer comprises a 0.3%-0.8% cationic emulsion mixed with 99.2%-99.7% water, wherein after said wax formulation is applied, no further step of buffing or wiping or waiting for the water to evaporate is required.

* * * * *